United States Patent
Saito et al.

(10) Patent No.: US 9,933,034 B2
(45) Date of Patent: Apr. 3, 2018

(54) MOTOR DRIVE APPARATUS EQUIPPED WITH LIFE PREDICTION FUNCTION FOR MOTOR BRAKE

(71) Applicant: FANUC CORPORATION, Yamanashi (JP)

(72) Inventors: Sou Saito, Yamanashi (JP); Tsutomu Shikagawa, Yamanashi (JP); Kiichi Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 47 days.

(21) Appl. No.: 15/289,238

(22) Filed: Oct. 10, 2016

(65) Prior Publication Data

US 2017/0108071 A1     Apr. 20, 2017

(30) Foreign Application Priority Data

Oct. 14, 2015   (JP) .................................. 2015-202838

(51) Int. Cl.
  *F16D 66/02*     (2006.01)
  *B60T 17/22*     (2006.01)

(52) U.S. Cl.
  CPC .......... *F16D 66/022* (2013.01); *B60T 17/221* (2013.01)

(58) Field of Classification Search
  None
  See application file for complete search history.

(56) References Cited

U.S. PATENT DOCUMENTS

2010/0301785 A1*  12/2010  Davis ..................... B60T 13/04
                                                    318/365

FOREIGN PATENT DOCUMENTS

| JP | 971239 A | 3/1997 |
| JP | 3192817 B2 | 7/2001 |
| JP | 2002528681 A | 9/2002 |
| JP | 2002303344 A | 10/2002 |
| JP | 200617471 A | 1/2006 |
| JP | 2015000466 A | 1/2015 |

OTHER PUBLICATIONS

English Abstract for Japanese Publication No. 3192817 B2, published Jul. 30, 2001, 2 pgs.

(Continued)

*Primary Examiner* — Rodney A Butler
*Assistant Examiner* — Tamara L Weber
(74) *Attorney, Agent, or Firm* — Fredrikson & Byron, P.A.

(57) ABSTRACT

A motor drive apparatus includes: a motor current detection unit; a brake release determination unit that determines that the brake is not released when the motor current detected when the motor is operated under a predetermined load by application of a voltage to a brake coil is larger than a current for when the brake is normally released; a brake coil voltage change unit that changes a voltage applied to the brake coil when it is determined that the brake is not released to a larger value; a change history storage unit that stores the voltage after being changed and change date and time; and a life prediction unit that calculates a predicted life of the brake apparatus based on the voltage after being changed and the change date and time and the previously stored failure-time brake coil voltage.

5 Claims, 3 Drawing Sheets

(56) References Cited

OTHER PUBLICATIONS

English Abstract for Japanese Publication No. 2015-000466 A, published Jan. 15, 2015, 1 pg.
English Abstract for Japanese Publication No. 2002-303344 A, published Oct. 18, 2002, 1 pg.
Untranslated Decision to Grant a Patent mailed by Japan Patent Office (JPO) for Application No. JP 2015-202838 dated Sep. 19, 2017, 3 pages.
English machine translation of Decision to Grant a Patent mailed by Japan Patent Office (JPO) for Application No. JP 2015-202838 dated Sep. 19, 2017, 3 pages.
English Abstract for Japanese Publication No. 2006-017471 A, published Jan. 19, 2006, 1 pg.
English Abstract for Japanese Publication No. 2002528681 A, published Sep. 3, 2002, 2 pgs.
English Abstract for Japanese Publication No. 09-071239 A, published Mar. 18, 1997, 1 pg.

* cited by examiner

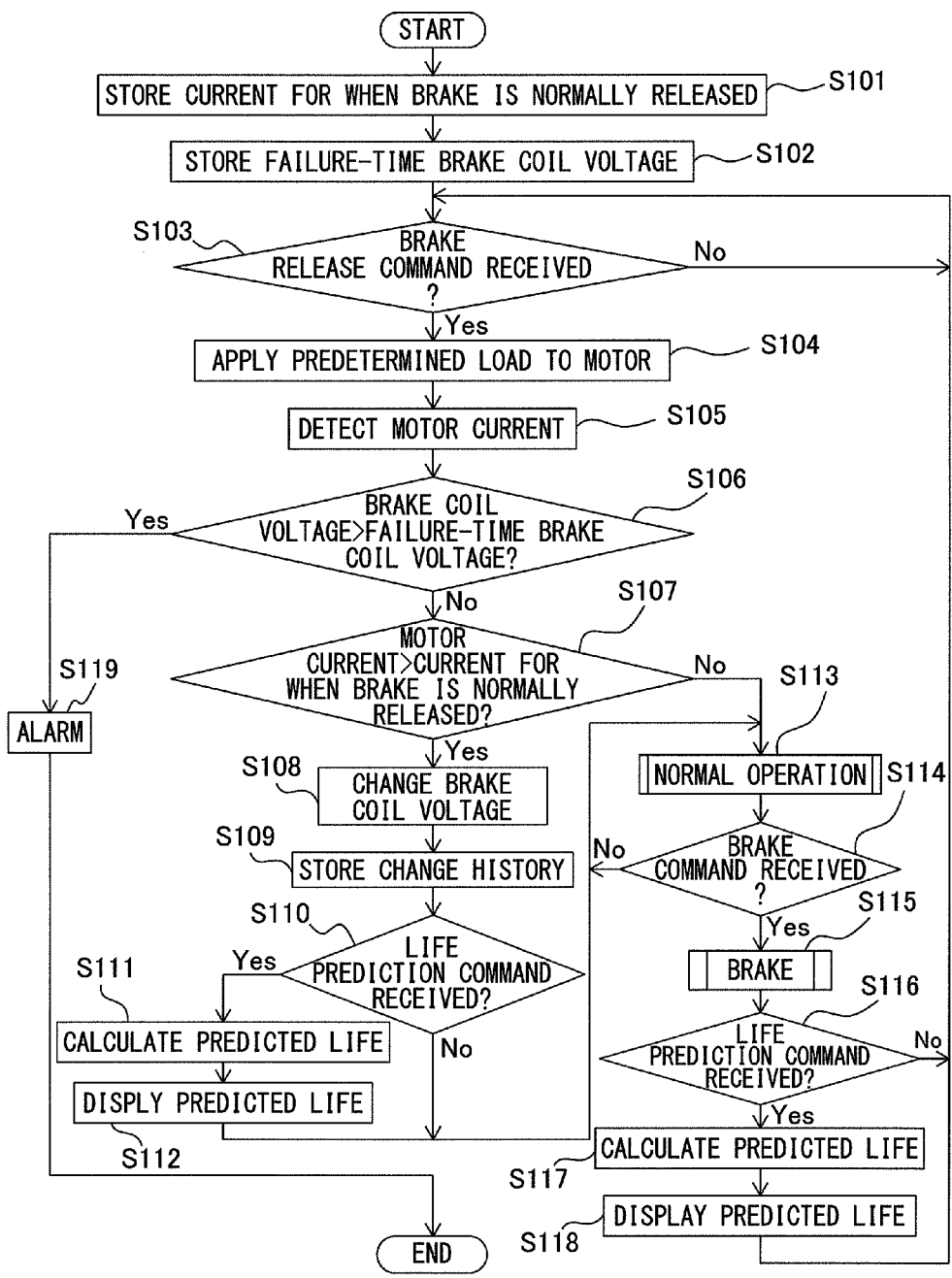

MOTOR DRIVE APPARATUS EQUIPPED WITH LIFE PREDICTION FUNCTION FOR MOTOR BRAKE

BACKGROUND OF THE INVENTION

1. Field of the Invention

The present invention relates to a motor drive apparatus equipped with a friction brake apparatus for braking a motor with a friction plate.

2. Description of the Related Art

In a motor drive apparatus, use is conventionally made of a friction brake apparatus for braking a motor with a friction plate held between an armature and an end plate. FIGS. 3A and 3B are sectional views illustrating a structure of a general friction brake apparatus.

In a friction brake apparatus 100, a friction plate 111 is interposed between an armature 112 and an end plate 113. A hub 122 is spline-coupled to the friction plate 111 and is made integral with a shaft 121 of a motor by shrink fitting such that the friction plate 111 is also rotated in linkage with rotation of the shaft 121 of the motor. The end plate 113 and a spacer 117 are coupled together by a bolt 118, and the armature 112 is coupled to the spacer 117 so as to be movable in a direction toward and away from the friction plate 111. In a core 116, there are provided a spring 114 and a brake coil 115. In a state in which a brake coil voltage is not applied to the brake coil 115, the armature 112 is strongly pressed against the friction plate 111 due to an elastic force of the spring 114, and the friction plate 111 is held between the armature 112 and the end plate 113 and prevented from rotating. Consequently, the shaft 121 coupled to the friction plate 111 also becomes nonrotatable, and a state occurs in which braking is applied to the motor. In contrast, when a brake coil voltage is applied to the brake coil 115, an electromagnetic force is generated in the core 116 and overcomes the elastic force of the spring 114 pressing the armature 112 against the friction plate 111, whereby the armature 112 is attracted to the core 116 so that the friction plate 111 is released from contact with the armature 112 and the end plate 113. Consequently, the friction plate 111 and thus the shaft 121 become freely rotatable, and a state occurs in which the brake of the motor is released.

As described above, in the friction brake apparatus 100, the motor is braked by non-application of the brake coil voltage to the brake coil 115, and the brake of the motor is released by application of the brake coil voltage to the brake coil 115. Since the brake is applied due to friction between the friction plate 111 and the armature 112 and that between the friction plate 111 and the end plate 113, the friction plate 111 is worn each time the brake is applied, and consequently the distance between the armature 112 and the core 116 in a state in which the brake is released is gradually increased. When the friction plate 111 is excessively worn, the friction plate 111 becomes unable to be released from contact with the armature 112 and the end plate 113, in other words, the brake cannot be released unless a large attracting force is generated by applying a higher brake coil voltage to the brake coil 115. The state in which the brake cannot be released as above is generally recognized as a "state in which the life of the friction brake 100 is reached" or as a "state in which the friction brake apparatus 100 is in failure."

In order to avoid a situation in which the brake cannot be released, it is also possible to use a method such as applying a high brake coil voltage to the brake coil 115 such that a sufficient attracting force can be obtained even when the friction plate 111 becomes thin. However, this method may not be desirable because power is consumed wastefully as the brake is released by application of a wastefully high brake coil voltage in a state in which there is a small amount of wear in the friction plate 111, which has only been used for a short period of time, of the friction brake apparatus 100.

For such reasons, in a friction brake apparatus, it is important to accurately grasp the degree of wear of the friction plate and thus the timing when the life of the friction plate is reached, thereby making it possible that the brake is released reliably and efficiently.

For example, as described in Japanese Patent Publication No. 3192817, a method is known in which a predetermined load is applied to a motor in a state in which the brake is normally released, and a motor current at this time is previously stored; and each time the brake is released, the predetermined load is applied to the motor and when a motor current at this time is larger than the previously stored motor current, it is determined that a brake failure has occurred. This method makes use of the property that it is necessary to flow a large current through the motor when it is attempted to forcibly drive the motor in a state in which the brake is not released.

Further, for example, as described in Japanese Laid-open Patent Publication No. 2015-466, a method is known in which when a motor does not rotate after a brake release is commanded, a voltage applied to the brake is increased, and when the motor rotates, it is determined that the brake is normally released.

Further, for example, as described in Japanese Laid-open Patent Publication No. 2002-303344, an apparatus is known in which a brake apparatus includes, as a device that can determine the life of a vehicle's brake element, a detection circuit that detects that a lining of the brake element is worn by a predetermined amount and a measurement circuit that measures a running distance of the vehicle, wherein the apparatus determines a life span until the thickness of the lining of the brake element reaches an allowable wear limit thickness from a residual thickness at a time when the lining of the brake element is worn by the predetermined amount and a running distance of the vehicle until the predetermined amount of wear is reached.

As described above, in the friction brake apparatus configured to cause the brake to be engaged by friction between the friction plate and the armature and that between the friction plate and the end plate, it is important to accurately grasp the wear of the friction plate since the friction plate is gradually worn as the number of times of braking is increased and when the friction plate is excessively worn, it becomes unable to release the brake.

However, according to the inventions described in Japanese Patent Publication No. 3192817 and Japanese Laid-open Patent Publication No. 2015-466, it is possible to detect life arrival (in other words, occurrence of a failure) due to wear of a friction plate in a friction brake apparatus, but it is not possible to predict a timing when the life of the friction brake apparatus comes to an end. For example, provided it is possible to predict the timing when the life of the friction brake apparatus comes to the end, it is efficient in that it is possible to perform maintenance work such as repair, replacement or the like during a time slot for which the friction brake apparatus is not used such as close of business time, but according to the invention described in Japanese Patent Publication No. 3192817, it is inefficient in that the maintenance work is performed after occurrence of a failure in the friction brake apparatus is detected. Further, according to the invention described in Japanese Patent Publication No. 3192817, since the brake coil voltage applied to the brake coil remains constant regardless of the deterioration state of the friction plate, particularly, failure detection is performed by application of an uneconomically high brake coil voltage even in a state in which the amount of wear of the friction plate is small due to the duration of use of the friction brake apparatus being short, and thus, undesirably, power is consumed wastefully. Further, according the invention described in Japanese Laid-open Patent Publication No. 2002-303344, in order to predict the life of the vehicle's brake element, it is required that a circuit for measuring a running distance of the vehicle corresponding to a thickness of a friction plate be separately provided in the brake apparatus, and hence there is a problem in that the number of parts is increased, which leads to an increase in size as well as an increase in cost of the apparatus.

SUMMARY OF THE INVENTION

In view of the above problems, it is an object of the present invention to provide a small-sized and low-cost motor drive apparatus capable of predicting the life of a friction brake apparatus with lower power consumption.

To achieve the above object, a motor drive apparatus equipped with a brake apparatus, which applies braking to a motor by pressing an armature against a friction plate coupled to a motor shaft by an elastic force of a spring and releases the brake of the motor by pulling the friction plate away from the armature with an electromagnetic force generated by application of a brake coil voltage to a brake coil, the motor drive apparatus including: a motor current detection unit that detects a motor current which flows through the motor; a brake release determination unit that determines that the brake is not released when the motor current detected by the motor current detection unit when the motor is operated under the predetermined load in a state in which the brake coil voltage is applied to the brake coil when a brake release command is received is larger than the previously stored current for when the brake is normally released, and determines that the brake is released when the motor current is smaller than or equal to the current for when the brake is normally released; a brake coil voltage change unit changes the brake coil voltage applied to the brake coil to a value larger than that applied when the brake release command was received last time, when the brake release determination unit determines that the brake is not released; a change history storage unit that stores the brake coil voltage after being changed by the brake coil voltage change unit and the change date and time; and a life prediction unit that calculates a predicted life of the brake apparatus based on the brake coil voltage and the change date and time stored in the change history storage unit and the failure-time brake coil voltage previously stored.

The motor drive apparatus may further include: a motor current storage unit in which a current for when the brake is normally released is previously stored which is a motor current detected by a motor current detection unit when the motor is operated under a predetermined load in a state in which the brake of the motor is normally released; and a failure-time brake coil voltage storage unit in which a failure-time brake coil voltage is previously stored which is the brake coil voltage for when the armature cannot be pulled away from the friction plate even by an electromagnetic force generated by application of the brake coil voltage to the brake coil.

The motor drive apparatus may further include a display unit that displays a predicted life calculated by the life prediction unit.

The motor drive apparatus may further include an alarm unit that alarms that the brake apparatus is in failure when the brake coil voltage after being changed by the brake coil voltage change unit exceeds the failure-time brake coil voltage.

Further, the life prediction unit may calculate a predicted life of the brake apparatus using linear approximation or least-squares method based on the brake coil voltage and the change date and time stored in the change history storage unit and the previously stored failure-time brake coil voltage.

BRIEF DESCRIPTION OF THE DRAWINGS

The present invention will be understood more clearly by referring to the following accompanying drawings:

FIG. 2 is a flow chart illustrating an operation flow of the motor drive apparatus according to the embodiment.

DETAILED DESCRIPTION

A motor drive apparatus equipped with a life prediction function for a motor brake will be described below with reference to the drawings. It should be understood that the present invention is not limited to the drawings or embodiments described below.

Figure 1:
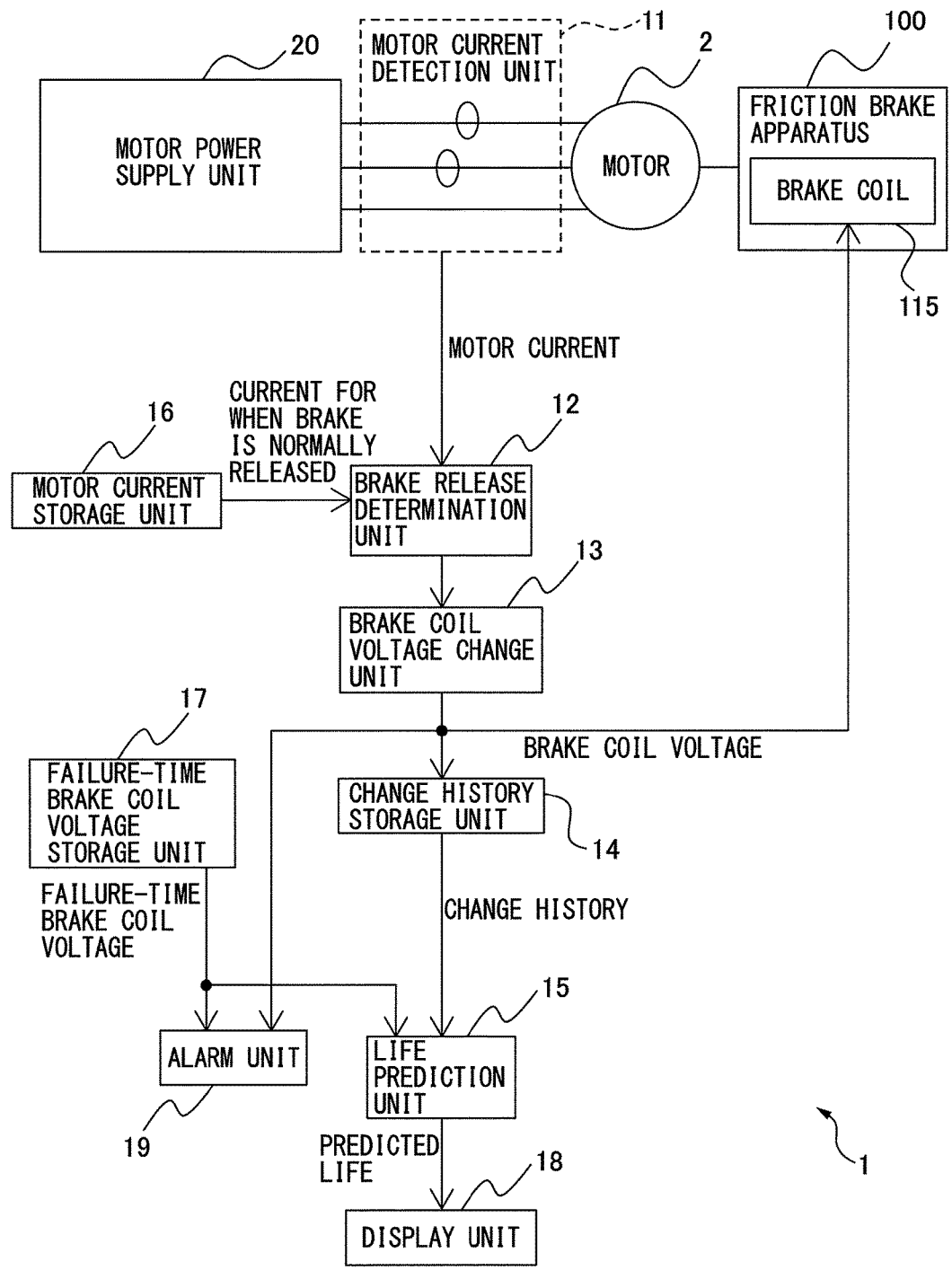
FIG. 1 is a principle block diagram of a motor drive apparatus according to an embodiment.

FIG. 1 is a principle block diagram of a motor drive apparatus according to an embodiment. Description will herein be made of a case in which a motor 2 is controlled by a motor drive apparatus 1. Incidentally, although, in the example illustrated in FIG. 1, the motor 2 is an AC motor, the type of the motor 2 does not limit the present invention, and the motor may be a DC motor. Further, when the motor 2 is an AC motor, it may be an induction motor or a synchronous motor. Further, the method for driving the motor 2 does not limit the present invention, but may be any known driving method.

The motor drive apparatus 1 includes a motor power supply unit 20 and a friction brake apparatus 100.

The motor power supply unit 20 converts DC power to AC power and supplies it to the motor 2. Thus, the motor 2 operates based on the AC power supplied. The motor power supply unit 20 may, for example, be a PWM inverter. Although not illustrated herein, in a DC link which is a DC side of the motor power supply unit 20 composed of a PWM inverter, there is provided a rectifier that converts AC power supplied from an AC power supply side to DC power and outputs it to the DC link. Incidentally, when the motor 2 is a DC motor, the motor power supply unit 20 is composed of a DC power supply or a rectifying converter (rectifier) that converts and outputs AC power supplied from the AC power supply side to DC power.

Figure 3A:
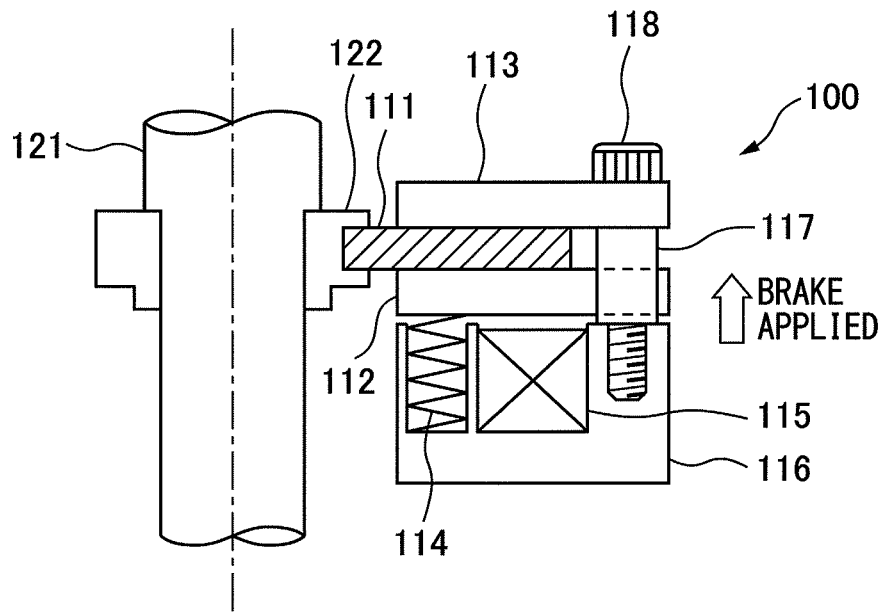
FIGS. 3A and 3B are sectional views illustrating a structure of a general friction brake apparatus.
Figure 3B:
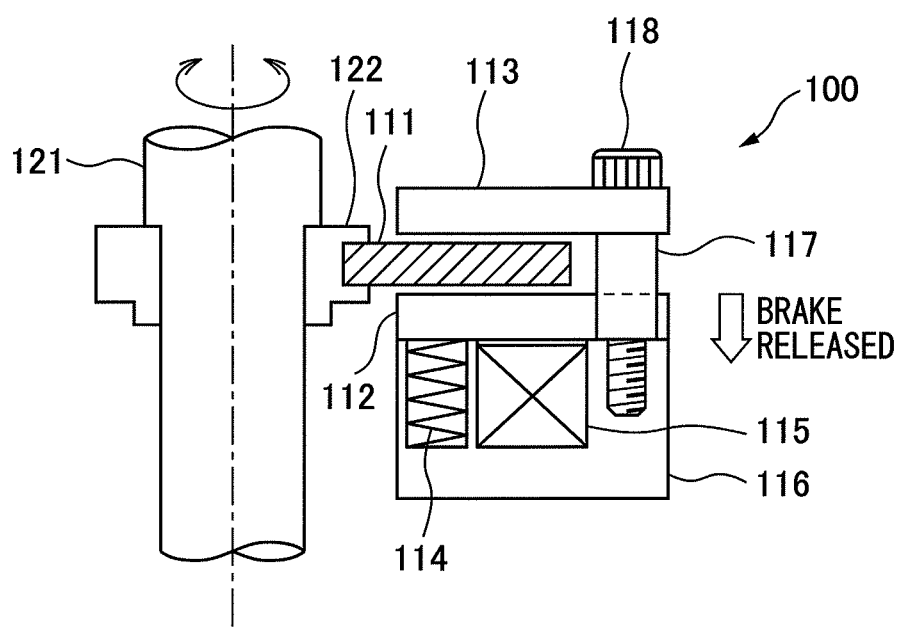

The friction brake apparatus 100 applies braking to the motor 2 by causing an armature to be pressed against a friction plate coupled to a motor shaft by an elastic force of a spring and releases the brake of the motor 2 by pulling the friction plate away from the armature with an electromagnetic force generated by applying a brake coil voltage to a brake coil 115. The friction brake apparatus 100 is configured and operates as described with reference to FIGS. 3A and 3B.

The motor drive apparatus 1 according to the embodiment includes a motor current detection unit 11, a brake release determination unit 12, a brake coil voltage change unit 13, a change history storage unit 14, a life prediction unit 15, a motor current storage unit 16, a failure-time brake coil voltage storage unit 17, and a display unit 18, and alarm unit 19.

The motor current detection unit 11 detects a motor current that flows in the motor 2 from the motor power supply unit 20. The value of the motor current detected by the motor current detection unit 11 is sent to the brake release determination unit 12.

The motor current storage unit 16 stores a value of a current for when the brake is normally released. The value of the current for when the brake is normally released is previously acquired before the motor drive apparatus 1 is actually operated. Preferably, the experiment is performed when the friction brake apparatus 100 is in a brand-new state (i.e., in a state in which the there is no wear in the friction plate) or in a state close thereto. In the experiment, the motor 2 is operated under a predetermined load in a state in which the brake of the motor 2 is normally released; a motor current which flows into the motor 2 from the motor power supply unit 20 at this point of time is detected by the motor current detection unit 11; a value equal to the detected value plus a predetermined margin is set as the "current for when the brake is normally released"; and the value is stored in the motor current storage unit 16. The reason that the current for when the brake is normally released is set as the value equal to the current detection value plus the predetermined margin by the motor current detection unit 11 is in order to prevent a false detection in the brake release when the current when the brake is normally released is used as a determination criteria for brake release.

The brake release determination unit 12 determines that the brake is not released when the motor current detected by the motor current detection unit 11 when the motor 2 is operated under the predetermined load in a state in which the brake coil voltage is applied to the brake coil 115 when a brake release command is received from a control unit (not illustrated) that integrally controls drive of the motor 2 is larger than the current for when the brake is normally released which is previously stored in the motor current storage unit 16, and determines that the brake is released when the motor current is smaller than or equal to the current for when the brake is normally released. The result of determination by the brake release determination unit 12 is sent to the brake coil voltage change unit 13. The "predetermined load" is the same as that which is used when acquiring the value of the current for when the brake is normally released which is stored in the motor current storage unit 16. As described above, since, as the friction plate of the friction brake apparatus 100 is worn and thinned, the force pressing the friction plate against the armature and the end plate by the spring becomes further strong, it turns out, when the brake is released, that an electromagnetic force which pulls the friction plate away from the armature and the end plate cannot be generated unless a higher brake coil voltage is applied to the brake coil 115. In other words, the degree of wear of the friction plate is directly reflected in the magnitude of the motor current detected by the motor current detection unit 11 when the motor 2 is operated under the predetermined load when the brake release command is received. Accordingly, in the present invention, an observation is made of a motor current when the motor 2 is operated under the predetermined load in a state in which the brake coil voltage is applied to the brake coil 115 when the brake release command is received, and a determination is made as to whether the brake could be released based on a magnitude relationship between the motor current and the current for when the brake is normally released.

The brake coil voltage change unit 13 changes the brake coil voltage applied to the brake coil 115 to a value larger than that applied when the brake release command was received last time, when the brake release determination unit 12 determines that the brake is not released. Since, as the friction plate is worn and thinned, a higher brake coil voltage is required to release the brake, the brake coil voltage change unit 13 changes the brake coil voltage to a value larger than the previous one each time the brake release determination unit 12 determines that the brake is not released. The brake coil voltage after being changed is set to a value for which the brake can be released, and the smaller the difference between the "value for which the brake can be released" and the "value of the brake coil voltage applied last time", the more preferable. In this manner, in the present invention, the brake coil voltage is gradually changed to be a large value depending on the degree of wear of the friction plate, so that there is no possibility that power is consumed wastefully to release the brake or to predict the life of the friction plate as in the prior art. Further, there is also an advantage in that the life of the brake coil 115 is increased as compared with the prior art since an unnecessarily high brake coil voltage is not applied to the brake coil 115. The value of the brake coil voltage after being changed is sent to the change history storage unit 14, the alarm unit 19, and the brake coil 115. Incidentally, with respect to the brake coil 115, the brake coil voltage change unit 13 commands a DC power supply device (not illustrated), which applies a brake coil voltage to the brake coil 115, to output a brake coil voltage of a value higher than that applied when the brake release command was received last time.

The change history storage unit 14 stores the brake coil voltage after being changed by the brake coil voltage change unit 13 and the then change date and time. The "date and time of the change" stored in the change history storage unit 14 is information concerning, for example, "year", "year and month", or "year, month and date", and in addition thereto, information concerning "hour", "hour and minute", or "hour, minute, and second" may be included when the change history is recorded in more detail.

The failure-time brake coil voltage storage unit 17 stores, as the failure-time brake coil voltage, the brake coil voltage when the armature cannot be pulled away from the friction plate even by an electromagnetic force generated by application of a brake coil voltage to the brake coil 115. The failure-time brake coil voltage corresponds to the life of the friction plate in the friction brake apparatus 100. For example, with respect to a friction brake apparatus 100 the life of which came to an end in the past (i.e., the friction plate of which became thin and unable to release the brake), by experiment, a brake coil voltage for when the armature could be pulled away from the friction plate may be measured, and a value slightly smaller than the measured value may be set as the "failure-time brake coil voltage". When the failure-time brake coil voltage is set, reference may also be made about life data defined in a specification table of the friction brake apparatus 100.

The life prediction unit 15 calculates a predicted life of the friction brake apparatus 100 based on the brake coil voltage and the change date and time stored in the change history storage unit 14 and the failure-time brake coil voltage previously stored in the failure-time brake coil voltage storage unit 17. In other words, the life calculation unit 15 predicts and calculates when the brake coil voltage changed by the brake coil voltage change unit 13 reaches the failure-time brake coil voltage $V_f$, based on information concerning the brake coil voltage $V_x$ and the change date and time $t_x$ stored in the change history storage unit 14. For the prediction and calculation, use may be made of a statistical technique, such as linear approximation or least-squares method. Description is made of an example in which linear approximation is used for the prediction and calculation, wherein when the failure-time brake coil voltage $V_f$ is set to be 30 [V], for a case in which the brake coil voltage $V_1$=24 [V] and the then change date and time $t_{x1}$=April 2015 and the brake coil voltage $V_2$=25 [V] and the then change date and time $t_{x2}$=October 2015, when considered linearly, it takes six (6) months for the brake coil voltage to increase by 1 [V], and thus it can be predicted that it is after thirty (30) months, in which the brake coil voltage increases by 5 [V], that the life comes to an end. Although description has been made herein of linear approximation, it is possible, for example, that a modification may be added so that weighting is performed, for example, for a certain voltage interval in the linear approximation.

The display unit 18 displays the predicted life calculated by the life prediction unit 15. Further, the display unit 18 may be configured to display information that encourages replacement of the friction plate of the friction brake apparatus 100 based on the predicted life calculated by the life prediction unit 15. By the display unit 18, the operator can know the predicted life of the friction plate of the friction brake apparatus 100, and thus can replace the friction plate before the life of the friction plate is reached (before the friction brake apparatus 100 suffers a failure). By virtue of the friction plate being able to be replaced at an appropriate timing, it is possible to streamline the maintenance operation as well as to reduce the stock of the spare friction plates. The display unit 18 may use, for example, a display of a personal computer, portable terminal, touch panel or the like or a display attached to a motor drive apparatus 1, and, for example, displays the predicted life in letters or patterns on the display. Alternatively, the display unit 18 may take a form in which a form in which what is printed out on a paper surface or the like by a printer is displayed. Further, the predicted life may be notified to the operator using an audio device that emits a sound, such as speaker, buzzer, chime or the like, in place of or together with the display unit 18.

The alarm unit 19 gives an alarm that "the brake apparatus is in failure" when the brake coil voltage after being changed by the brake coil voltage change unit 13 exceeds the failure-time brake coil voltage previously stored in the failure-time brake coil voltage storage unit 17. The alarm is given by display and/or sound. Specific examples of the alarm unit 19 include a display of a personal computer, portable terminal, touch panel or the like, a display attached to the motor drive apparatus 1, an audio device that emits sound, such as a speaker, buzzer, chime or the like, and so forth. Further, for example, the alarm unit 19 may be implemented integrally with the above display unit 18.

Incidentally, although, in the present embodiment, the motor drive apparatus 1 is provided with both the display unit 18 and the alarm unit 19, either one of them may be omitted.

FIG. 2 is a flow chart illustrating an operation flow of the motor drive apparatus according to the embodiment.

First, at step S101, the value of a current for when the brake is normally released is stored in the motor current storage unit 16. As described above, the value of the current for when the brake is normally released is previously acquired by experiment before the motor drive apparatus 1 is actually operated. In the experiment, the motor 2 is operated under a predetermined load in a state in which the brake of the motor 2 is normally released; a motor current that flows in the motor 2 from the motor power supply unit 20 at this point of time is detected by the motor current detection unit 11; and a value equal to the detected value plus a predetermined margin is set as the "current for when the brake is normally released" and stored in the motor current storage unit 16.

Then, at step S102, when the armature cannot be pulled away from the friction plate even by an electromagnetic force generated by application of a brake coil voltage to the brake coil 115, the brake coil voltage is stored in the failure-time brake coil voltage storage unit 17 as the failure-time brake coil voltage. For example, with respect to a friction brake apparatus 100 the life of which came to an end in the past (i.e., the friction plate of which became thin and unable to release the brake), by experiment, a brake coil voltage for when the armature could be pulled away from the friction plate is measured, and a value slightly smaller than the measured value is set as the "failure-time brake coil voltage" and stored in the failure-time brake coil voltage storage unit 17.

Incidentally, the above steps S101 and S102 may be performed interchanging the order.

At step S103, the brake release determination unit 12 determines whether a brake release command is received from a control unit (not illustrated) that integrally controls drive of the motor 2. When the brake release command is received, the process proceeds to step S104.

At step S104, the motor power supply unit 20 causes the motor 2 to be operated under a predetermined load by supplying AC power to the motor 2 in a state in which the brake coil voltage is applied to the brake coil 115. The "predetermined load" referred to herein is the same as that used when acquiring the value of the current for when the brake is normally released which is stored in the motor current storage unit 16 at step S101.

At step S105, the motor current detection unit 11 detects a motor current which flows in the motor 2 from the motor power supply unit 20.

At step S106, the alarm unit 19 determines whether the brake coil voltage is higher than the failure-time brake coil voltage which is previously stored in the failure-time brake coil voltage storage unit 17. When it is determined that the brake coil voltage is higher than the failure-time brake coil voltage, the process proceeds to step S119, and when it is determined that the brake coil voltage is lower than or equal to the failure-time brake coil voltage, the process proceeds to step S107.

At step S119, the alarm unit 19 gives an alarm that "the brake apparatus is in failure".

At step S107, the brake release determination unit 12 determines whether the motor current detected by the motor current detection unit 11 at step S105 is larger than the current for when the brake is normally released which is previously stored in the motor current storage unit 16. When it is determined that the motor current detected by the motor current detection unit 11 at step S105 is larger than the current for when the brake is normally released, it is determined that the brake is not released, and the process proceeds to step S108. When it is determined that the motor current detected by the motor current detection unit 11 at step S105 is smaller than or equal to the current for when the brake is normally released, it is determined that the brake is released, and the process proceeds to step S113; and at step S113, AC power is supplied from the motor power supply device 20 to the motor 2, and the motor 2 is normally operated.

At step S108, the brake coil voltage change unit 13 changes the brake coil voltage applied to the brake coil 115 to a value larger than that applied when the brake release command was received last time. As described above, since the brake coil voltage after being changed is set to a value for which the brake can be released, the friction plate of the friction brake apparatus 100 is released from contact with the armature and the end plate due to the "brake coil voltage after being changed", and the motor 2 can freely rotate when AC power is supplied thereto (normal operation at step S113).

At subsequent step S109, the change history storage unit 14 stores the brake coil voltage after being changed by the brake coil voltage change unit 13 at step S108 and the then change date and time.

At step S110, the life prediction unit 15 determines whether a life prediction command is received. The life prediction command is outputted by manipulation by the operator of an input device such as keyboard, mouse, touch panel or the like or by switch depression. When it is determined that the life prediction command is received, the process proceeds to step S111. When it is determined that the life prediction command is not received, the process proceeds to step S113. Incidentally, it may be configured such that step S110 is omitted and after step S109, the process proceeds directly to step S111.

At step S111, the life prediction unit 15 calculates a predicted life of the friction brake apparatus 100 based on the brake coil voltage and the change date and time stored in the change history storage unit 14 and the failure-time brake coil voltage which is previously stored in the failure-time brake coil voltage storage unit 17.

At step S112, the display unit 18 displays the predicted life calculated by the life prediction unit 15. Subsequently, the process proceeds to step S113.

At the starting point of step S113, since the brake coil voltage is applied to the brake coil 115, the friction plate of the friction brake apparatus 100 is released from contact with the armature and the end plate, so that the motor 2 can freely rotate when AC power is supplied for normal operation of the motor 2.

At step S114, the friction brake apparatus 110 determines whether a brake command is received from a control unit (not illustrated) that integrally controls drive of the motor 2. When it is determined that the brake command is received, at step S115, the friction brake apparatus 110 stops the application of the brake coil voltage to the brake coil 115. In this manner, the armature becomes strongly pressed against the friction plate by the elastic force of the spring, and thus the friction plate is held between the armature and the end plate and prevented from rotating, so that a state occurs in which the motor 2 is braked.

At step S116, the life prediction unit 15 determines whether the life prediction command is received. When it is determined that the life prediction command is received, the process proceeds to step S117. When it is determined that the life prediction command is not received, the process returns to step S103. Incidentally, it may be configured such that step S116 is omitted, and after step S115, the process proceeds directly to step S117.

At step S117, the life prediction unit 15 calculates the predicted life of the friction brake apparatus 100 based on the brake coil voltage and the change date and time stored in the change history storage unit 14 and the failure-time brake coil voltage which is previously stored in the failure-time brake coil voltage storage unit 17.

At step S118, the display unit 18 displays the predicted life calculated by the life prediction unit 15. Subsequently, the process returns to step S103. Incidentally, although, in the present embodiment, the group of processes of steps S116 to S118 are performed after step S115, such group of processes may instead be performed between step S113 and step S114 or between step S114 and step S115.

Incidentally, although, in the present embodiment, two groups of processes, i.e., the group of processes of steps S110 to s112 and the group of processes of steps S116 to S118 are provided as the life prediction process, either one of the two groups of processes may be omitted.

The brake release determination unit 12, the brake coil voltage change unit 13, and the life prediction unit 15, which are described above, may for example be implemented in a form of software program or in a form of combination of a variety of electronic circuit and a software program. For example, when these units are implemented in a form of a software program, an arithmetic processing unit, which is provided in the motor drive apparatus 1 in order for the motor drive apparatus 1 to drive and control the motor 2, is operated in accordance with the software program, thereby making it possible to realize the function of each of the above units. Further, the change history storage unit 14, the motor current storage unit 16, and the failure-time brake coil voltage storage unit 17, which are described above, may be implemented in a memory (storage unit) which is provided in the motor drive apparatus 1 in order for the motor drive apparatus 1 to drive and control the motor 2. The motor current detection unit 11 described above is also provided in the motor drive apparatus 1 in order for the motor drive apparatus 1 to drive and control the motor 2. For the display unit 18 and the alarm unit 19 described above, the ones already provided in the motor drive apparatus 1 may be used. As such, the present invention does not require any additional hardware component, and thus the apparatus is not large sized, and is low in cost. Further, since it is not necessary to separately provide any new hardware component, a retrofit application to an existing motor drive apparatus is also possible.

According to the present invention, it is possible to achieve a small-sized and low-cost motor drive apparatus capable of predicting a life of a friction brake apparatus with low power consumption.

According to the present invention, it is possible for the operator to determine a predicted life of a friction plate of a friction brake apparatus and therefore to replace the friction plate before the life of the friction plate is reached (in other words, before the friction brake apparatus suffers a failure). By referring to the predicted life as determined, it becomes possible to perform maintenance work such as repair or replacement of the friction plate in a time zone such, for example, as closing time of business when the friction brake apparatus is not used. As a result of the friction plate being able to be replaced at an appropriate time, it is possible to improve the efficiency of the maintenance work as well as to reduce the stock of the spare friction plates.

Further, according to the present invention, the brake coil voltage is gradually changed depending on the degree of wear of the friction plate of the friction brake apparatus to perform brake release and life prediction of the friction plate, so that there is no possibility that power is wastefully consumed to release the brake or to predict the life of the friction plate as in the conventional art. In addition, there is an advantage in that since wasteful brake coil voltage is not applied to the brake coil, the life of the brake coil is extended as compared with the conventional art.

Further, according to the present invention, particularly since no additional hardware component is needed, it does not occur that the apparatus is large-sized and the cost is increased for purpose of life prediction.

What is claimed is:

1. A motor drive apparatus including a brake apparatus that applies brake to a motor by pressing an armature with an elastic force of a spring against a friction plate coupled to a motor shaft and releases the brake of the motor by pulling the armature away from the friction plate with an electromagnetic force generated by application of a brake coil voltage to a brake coil, the motor drive apparatus, comprising:
   a motor current detection unit that detects a motor current which flows through the motor;
   a brake release determination unit that determines that the brake is not released when the motor current detected by the motor current detection unit when the motor is operated under a predetermined load in a state in which the brake coil voltage is applied to the brake coil when a brake release command is received is larger than a current for when the brake is normally released which is previously stored, and determines that the brake is released when the motor current is smaller than or equal to the current for when the brake is normally released;
   a brake coil voltage change unit that when the brake release determination unit determines that the brake is not released, changes the brake coil voltage applied to the brake coil to a value larger than that applied when the brake release command was received last time;
   a change history storage unit that stores the brake coil voltage after being changed by the brake coil voltage change unit and change date and time; and
   a life prediction unit that calculates a predicted life of the brake apparatus based on the brake coil voltage and the change date and time which are stored in the change history storage unit and a previously stored failure-time brake coil voltage.

2. The motor drive apparatus according to claim 1, further comprising:
   a motor current storage unit in which the current for when the brake is normally released is previously stored which is the motor current detected by the motor current detection unit when the motor is operated under the predetermined load in a state in which the brake of the motor is normally released;
   a failure-time brake coil voltage storage unit in which the failure-time brake coil voltage is previously stored which is the brake coil voltage for which the armature cannot be pulled away from the friction plate even with the electromagnetic force generated by application of the brake coil voltage to the brake coil.

3. The motor drive apparatus according to claim 1, further comprising a display unit that displays the predicted life calculated by the life prediction unit.

4. The motor drive apparatus according to claim 1, further comprising an alarm unit that gives an alarm that the brake apparatus suffers a failure when the brake coil voltage after being changed by the brake coil voltage change unit exceeds the failure-time brake coil voltage.

5. The motor drive apparatus according to claim 1, wherein the life prediction unit calculates the predicted life of the brake apparatus using linear approximation or least-squares method based on the brake coil voltage and the change date and time which are stored in the change history storage unit and the previously stored failure-time brake coil voltage.

* * * * *